(12) United States Patent
Kim et al.

(10) Patent No.: US 12,040,829 B2
(45) Date of Patent: Jul. 16, 2024

(54) TRANSCEIVER AND METHOD OF DRIVING THE SAME

(71) Applicant: SAMSUNG DISPLAY CO., LTD., Yongin-si (KR)

(72) Inventors: Hyun Su Kim, Yongin-si (KR); Dong Won Park, Yongin-si (KR); Jun Yong Song, Yongin-si (KR); Tae Young Jin, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 83 days.

(21) Appl. No.: 17/974,125

(22) Filed: Oct. 26, 2022

(65) Prior Publication Data

US 2023/0306893 A1  Sep. 28, 2023

(30) Foreign Application Priority Data

Mar. 28, 2022 (KR) .................. 10-2022-0038363

(51) Int. Cl.
*H04B 1/40* (2015.01)
*H04B 1/401* (2015.01)

(52) U.S. Cl.
CPC .............. *H04B 1/40* (2013.01); *H04B 1/401* (2013.01); *G09G 2300/0819* (2013.01); *G09G 2300/0842* (2013.01); *G09G 2310/08* (2013.01); *G09G 2330/021* (2013.01)

(58) Field of Classification Search
CPC . H04B 1/38; H04B 1/40; H04B 1/401; H04B 3/00; H04B 3/02; H04B 3/03; H04B 3/20; H04B 3/44; H04B 3/50; H04B 3/54; H04B 3/56; G09G 2300/0819; G09G 2300/0842; G09G 2310/08; G09G 2330/021
USPC ................ 375/219, 220, 222, 257, 356; 370/282–284
See application file for complete search history.

(56) References Cited

U.S. PATENT DOCUMENTS

| | | |
|---|---|---|
| 11,249,933 B2 | 2/2022 | Li |
| 2012/0166702 A1* | 6/2012 | Toba ................. H04N 21/43635 710/316 |
| 2015/0269112 A1* | 9/2015 | Hsueh ................. G06F 13/4072 710/105 |
| 2019/0012275 A1* | 1/2019 | Corbin ............. H04N 21/43615 |

* cited by examiner

*Primary Examiner* — Young T. Tse
(74) *Attorney, Agent, or Firm* — CANTOR COLBURN LLP

(57) ABSTRACT

A transceiver includes a transmitter and a receiver connected to each other by a first line and a second line. The transmitter transmits signals each having a first voltage range to the first line and the second line in a first mode, and signals each having a second voltage range less than the first voltage range to the first line and the second line in a second mode. The receiver includes a low-power driver which receives signals through the first line and the second line in an operating state of the first mode, and stops an operation thereof in the second mode, and a high-speed driver which receives signals through the first line and the second line in the second mode, and stops an operation thereof in the first mode.

20 Claims, 11 Drawing Sheets

FIG. 12

| | | Status | | | | |
|---|---|---|---|---|---|---|
| | | Power off | Power on | | | |
| | | | Stop | Sleep out/in | | ULPS |
| | | | | LP_OP | HS_OP | |
| Input | RESET | L | H | H | H | H |
| | P_EN | L | H | H | H | H |
| | ULPS_EN | L | L | L | L | H |
| | LP11_DET | L | H | L | L | L |
| | HS_TERM_EN | L | L | L | H | L |
| | P2_EN | L | H | H | H | L |
| | P1_EN | L | L | H | H | H |
| Output | LP_Block_EN | L | L | L | L | L |
| | HS_Block_EN | L | L | L | H | L |
| | PHY_LOGIC_EN | L | L | H | H | L |

TRANSCEIVER AND METHOD OF DRIVING THE SAME

The application claims priority to Korean patent application number 10-2022-0038363, filed on Mar. 28, 2022, and all the benefits accruing therefrom under 35 U.S.C. § 119, the content of which in its entirety is herein incorporated by reference.

BACKGROUND

1. Field

Various embodiments of the disclosure relate to a transceiver and a method of driving the transceiver.

2. Description of Related Art

With a development of information technology, an importance of a display device, which is a connection medium between a user and information, is being emphasized. Owing to the importance of display devices, a use of various kinds of display devices, such as a liquid crystal display device and an organic light-emitting display device, is being increased.

Generally, the display device may perform internal communication using a mobile industry processor interface protocol ("MIPI").

SUMMARY

Standard specifications of the MIPI provide only a state machine according to a driving mode rather than providing power control methods in respective states of the state machine.

Various embodiments of the disclosure are directed to a transceiver capable of controlling the use of power desired to drive the transceiver in each state of a state machine such that the power consumption may be minimized, and a method of driving the transceiver.

An embodiment of the disclosure provides a transceiver including a transmitter and a receiver connected to each other by a first line and a second line. The transmitter transmits signals each having a first voltage range to the first line and the second line in a first mode, and signals each having a second voltage range less than the first voltage range to the first line and the second line in a second mode. The receiver includes a low-power driver which receives signals through the first line and the second line in an operating state of the first mode, and stops an operation thereof in the second mode, and a high-speed driver which receives signals through the first line and the second line in the second mode, and stops an operation thereof in the first mode.

In an embodiment, the low-power driver may stop the operation thereof in a stop state of the first mode.

In an embodiment, the stop state may be a state in which high-level signals in the first voltage range are applied to the first line and the second line.

In an embodiment, the low-power driver may stop the operation thereof in an idle state of the first mode.

In an embodiment, the receiver may include a first power supply which generates a first power voltage in the second mode and in the operating state, the stop state, and the idle state of the first mode, and a second power supply which generates a second power voltage in the second mode and in the operating state and the stop state of the first mode. The second power supply may not generate the second power voltage in the idle state of the first mode.

In an embodiment, the receiver may further include an interface logic circuit which generates data and data control signals based on signals received from the low-power driver and the high-speed driver.

In an embodiment, one of the data control signals may be a clock signal indicating byte-unit transmission of the data.

In an embodiment, the interface logic circuit may be operated in the second mode and in the operating state of the first mode. The interface logic circuit may stop an operation thereof in the stop state and the idle state of the first mode.

In an embodiment, the receiver may further include a state detector which generates a first input control signal, a second input control signal, and a third input control signal. The first input control signal may be changed in level when the idle state starts or the idle state terminates. The second input control signal may be changed in level when the stop state starts or the stop state terminates. The third input control signal may be changed in level when the first mode is converted to the second mode or the second mode is converted to the first mode.

In an embodiment, the receiver may further include a first power supply which generates a first power voltage in the second mode and in the operating state, the stop state, and the idle state of the first mode, a second power supply which generates a second power voltage in the second mode and in the operating state and the stop state of the first mode, an interface logic circuit which generates data and data control signals based on signals received from the low-power driver and the high-speed driver, and a power controller which controls operations of the first power supply, the second power supply, the low-power driver, the high-speed driver, and the interface logic circuit, based on the first input control signal, the second input control signal, the third input control signal, a fourth input control signal, and a fifth input control signal. The fourth input control signal may be changed in level when the receiver is reset, or when the receiver is powered off. The fifth input control signal may be changed in level when the operations of the first power supply and the second power supply are enabled, or when the receiver is powered off.

An embodiment of the disclosure provides a method of driving a transceiver including a transmitter and a receiver connected to each other by a first line and a second line. The method includes transmitting, by the transmitter, signals each having a first voltage range to the first line and the second line in a first mode, receiving, by a low-power driver of the receiver, signals through the first line and the second line in an operating state of the first mode, and stopping, by a high-speed driver of the receiver, an operation thereof in the first mode, transmitting, by the transmitter, signals each having a second voltage range less than the first voltage range to the first line and the second line in a second mode, and stopping, by the low-power driver of the receiver, an operation thereof in the second mode, and receiving, by the high-speed driver of the receiver, signals through the first line and the second line in the second mode.

In an embodiment, the low-power driver may stop the operation thereof in a stop state of the first mode.

In an embodiment, the stop state may include a state in which high-level signals in the first voltage range are applied to the first line and the second line.

In an embodiment, the low-power driver may stop the operation thereof in an idle state of the first mode.

In an embodiment, a first power supply of the receiver may generate a first power voltage in the second mode and in the operating state, the stop state, and the idle state of the first mode. A second power supply of the receiver may generate a second power voltage in the second mode and in the operating state and the stop state of the first mode. The second power supply may not generate the second power voltage in the idle state of the first mode.

In an embodiment, an interface logic circuit of the receiver may generate data and data control signals based on signals received from the low-power driver and the high-speed driver.

In an embodiment, one of the data control signals may be a clock signal indicating byte-unit transmission of the data.

In an embodiment, the interface logic circuit may be operated in the second mode and in the operating state of the first mode. The interface logic circuit may stop the operation in the stop state and the idle state of the first mode.

In an embodiment, a state detector of the receiver may generate a first input control signal, a second input control signal, and a third input control signal. The first input control signal may be changed in level when the idle state starts or the idle state terminates. The second input control signal may be changed in level when the stop state starts or the stop state terminates. The third input control signal may be changed in level when the first mode is converted to the second mode, or the second mode is converted to the first mode.

In an embodiment, a first power supply of the receiver generates a first power voltage in the second mode and in the operating state, the stop state, and the idle state of the first mode. A second power supply of the receiver generates a second power voltage in the second mode and in the operating state and the stop state of the first mode. An interface logic circuit of the receiver generates data and data control signals based on signals received from the low-power driver and the high-speed driver. A power controller of the receiver may control operations of the first power supply, the second power supply, the low-power driver, the high-speed driver, and the interface logic circuit, based on the first input control signal, the second input control signal, the third input control signal, a fourth input control signal, and a fifth input control signal. The fourth input control signal may be changed in level when the receiver is reset, or when the receiver is powered off. The fifth input control signal may be changed in level when the operations of the first power supply and the second power supply are enabled, or when the receiver is powered off.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which:

FIG. 12 is a diagram for describing an embodiment of a power control method of the receiver in accordance with the disclosure.

DETAILED DESCRIPTION

Figure 1:
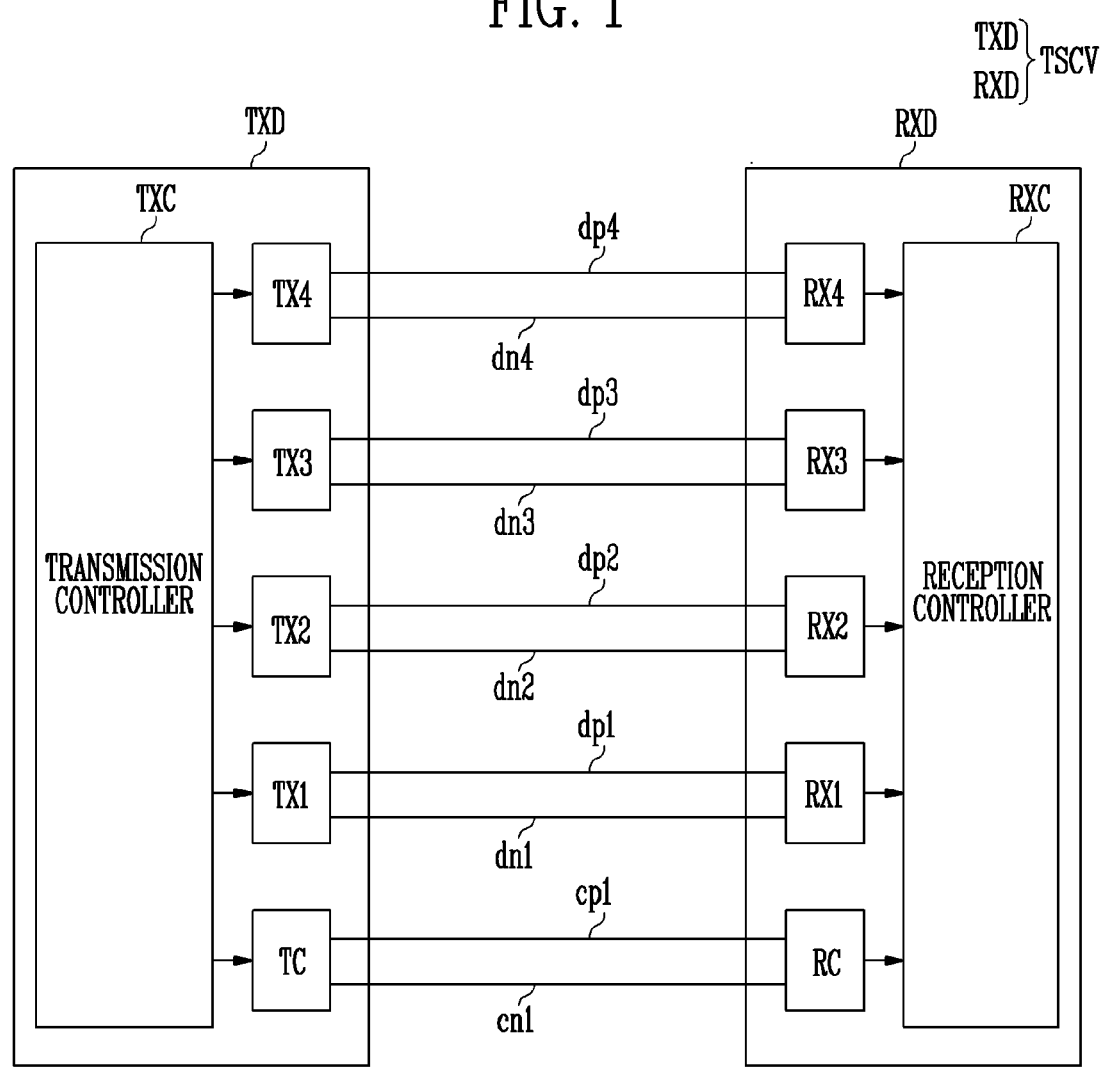
FIGS. 1 and 2 are diagrams for describing an embodiment of a transceiver in accordance with the disclosure.

Hereinafter, embodiments of the invention will be described in detail with reference to the attached drawings, such that those skilled in the art may easily implement the invention. The disclosure may be implemented in various forms, and is not limited to embodiments to be described herein below.

In the drawings, portions which are not related to the disclosure will be omitted to explain the disclosure more clearly. Reference should be made to the drawings, in which similar reference numerals are used throughout the different drawings to designate similar components. Therefore, aforementioned reference numerals may be used in other drawings.

For reference, the size of each component and the thicknesses of lines illustrating the component are arbitrarily expressed for the sake of explanation, and the disclosure is not limited to those illustrated in the drawings. In the drawings, the thicknesses of the components may be exaggerated to clearly express several layers and areas.

Furthermore, the expression "being the same" may mean "being substantially the same". In other words, the range of the expression "being the same" may refer to a range that may be conceded by those skilled in the art. The other expressions may also be expressions from which "substantially" has been omitted.

"Approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "approximately" can mean within one or more standard deviations, or within ±30%, 20%, 10%, 5% of the stated value, for example.

The term "unit" as used herein is intended to mean a software component or a hardware component that performs a predetermined function. The hardware component may include a field-programmable gate array ("FPGA") or an application-specific integrated circuit ("ASIC"), for example. The software component may refer to an executable code and/or data used by the executable code in an addressable storage medium. Thus, the software components may be object-oriented software components, class components, and task components, and may include processes, functions, attributes, procedures, subroutines, segments of program code, drivers, firmware, micro codes, circuits, data, a database, data structures, tables, arrays, or variables, for example.

Figure 2:
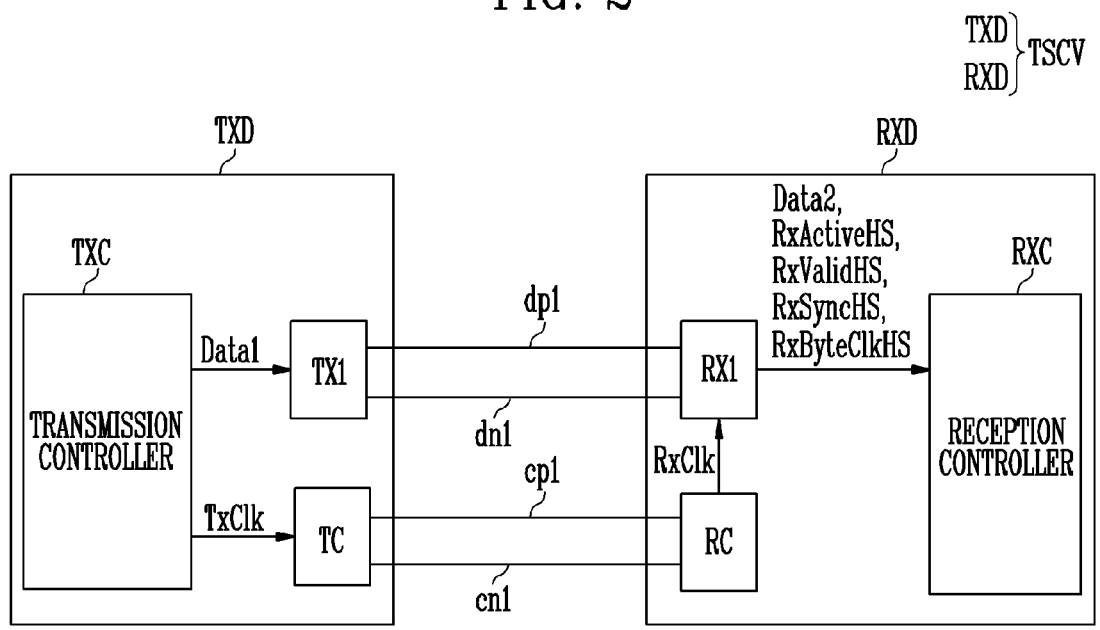

FIGS. 1 and 2 are diagrams for describing an embodiment of a transceiver TSCV in accordance with the disclosure.

Referring to FIG. 1, the transceiver TSCV may include a transmitter TXD and a receiver RXD.

The transmitter TXD may include a transmission controller TXC, a plurality of data transmission units TX1, TX2, TX3, and TX4, and a clock transmission unit TC. The receiver RXD may include a reception controller RXC, a plurality of data reception units RX1, RX2, RX3, and RX4, and a clock reception unit RC.

The first data transmission unit TX1 may be connected to the first data reception unit RX1 by a first line dp1 and a second line dn1. The first data transmission unit TX1 and the first data reception unit RX1 may be also collectively referred to as a first data channel. The second data transmission unit TX2 may be connected to the second data reception unit RX2 by a first line dp2 and a second line dn2. The second data transmission unit TX2 and the second data reception unit RX2 may be also collectively referred to as a second data channel. The third data transmission unit TX3 may be connected to the third data reception unit RX3 by a first line dp3 and a second line dn3. The third data transmission unit TX3 and the third data reception unit RX3 may be also collectively referred to as a third data channel. The fourth data transmission unit TX4 may be connected to the fourth data reception unit RX4 by a first line dp4 and a second line dn4. The fourth data transmission unit TX4 and the fourth data reception unit RX4 may be also collectively referred to as a fourth data channel. The clock transmission unit TC may be connected to the clock reception unit RC by a first clock line cp1 and a second clock line cn1. The clock transmission unit TC and the clock reception unit RC may be also collectively referred to as a clock channel.

The plurality of data transmission units TX1, TX2, TX3, and TX4, the clock transmission unit TC, the plurality of data reception units RX1, RX2, RX3, and RX4, and the clock reception unit RC may correspond to a physical layer and a datalink layer of an open systems interconnection ("OSI") 7-layer model, correspond to a network interface of a transmission control protocol/internet protocol ("TCP/IP"), or correspond to a physical layer of a mobile industry processor interface ("MIPI") protocol. The physical layer of the MIPI protocol may be formed according to various preset specifications such as a D-physical layer (a D-PHY), a C-PHY, and an M-PHY. Hereinafter, there will be described an embodiment in which the plurality of data transmission units TX1, TX2, TX3, and TX4, the clock transmission unit TC, the plurality of data reception units RX1, RX2, RX3, and RX4, and the clock reception unit RC are formed according to the D-PHY specification of the physical layer of the MIPI protocol.

The transmission controller TXC and the reception controller RXC may correspond to a network layer and a transport layer of the OSI 7-layer model, correspond to an internet and a transport of the TCP/IP, or correspond to a protocol layer of the MIPI protocol. The protocol layer of the MIPI protocol may be formed according to various preset specifications such as a display serial interface ("DSI"), and a camera serial interface ("CSI"). Hereinafter, there will be described an embodiment in which the transmission controller TXC and the reception controller RXC are formed according to the DSI specification of the protocol layer of the MIPI protocol.

Hardware-wise, the transmission controller TXC, the plurality of data transmission units TX1, TX2, TX3, and TX4, and the clock transmission unit TC may be components separated from each other or, alternatively, hardware-wise, at least two or more components may be integrated into a single component. Software-wise, the transmission controller TXC, the plurality of data transmission units TX1, TX2, TX3, and TX4, and the clock transmission unit TC may be components separated from each other or, alternatively, software-wise, at least two or more components may be integrated into a single component. The transmitter TXD may be formed as a part (hardware or software) of another controller (e.g., an application processor ("AP"), a graphics processing unit ("GPU"), and a central processing unit ("CPU")), or formed as independent hardware (e.g., a send-only integrated circuit ("IC")).

Hardware-wise, the reception controller RXC, the plurality of data reception units RX1, RX2, RX3, and RX4, and the clock reception unit RC may be components separated from each other or, alternatively, hardware-wise, at least two or more components may be integrated into a single component. Software-wise, the reception controller RXC, the plurality of data reception units RX1, RX2, RX3, and RX4, and the clock reception unit RC may be components separated from each other or, alternatively, software-wise, at least two or more components may be integrated into a single component. The receiver RXD may be formed as a part (hardware or software) of another controller (e.g., a timing controller ("TCON"), a TCON embedded driver ("TED") IC, or a driver IC ("D-IC")), or formed as independent hardware (e.g., a receive-only IC).

The transceiver TSCV of FIG. 1 may include four data channels. The four data channels may transmit and receive pieces of data that are dependent from each other. The fourth data channels may share one clock channel.

Referring to FIG. 2, there is illustrated an embodiment of the transceiver TSCV including one data channel that is the minimum number of data channels. In an embodiment, the transmitter TXD may include one first data transmission unit TX1, and the receiver RXD may include one data reception unit RX1, for example.

The transmission controller TXC may provide first data Data1 to the first data transmission unit TXT, and provide a transmission clock signal TxClk to the clock transmission unit TC.

The first data transmission unit TX1 may transmit the first data Data1 through the first line dp1 and the second line dn1. Here, the first data transmission unit TX1 may transmit additional pieces of data before and/or after the first data Data1 according to a preset protocol.

The clock transmission unit TC may transmit the transmission clock signal TxClk through the first clock line cp1 and the second clock line cn1.

The clock reception unit RC may provide, to the first data reception unit RX1, a reception clock signal RxClk received through the first clock line cp1 and the second clock line cn1.

The first data reception unit RX1 may sample data received through the first line dp1 and the second line dn1 based on the reception clock signal RxClk. The first data reception unit RX1 may provide second data Data2 including the same payload as that of the first data Data1 to the reception controller RXC. The first data reception unit RX1 may provide a plurality of desired data control signals RxActiveHS, RxValidHS, RxSyncHS, and RxByteClkHS to the reception controller RXC according to a protocol.

Figure 3:
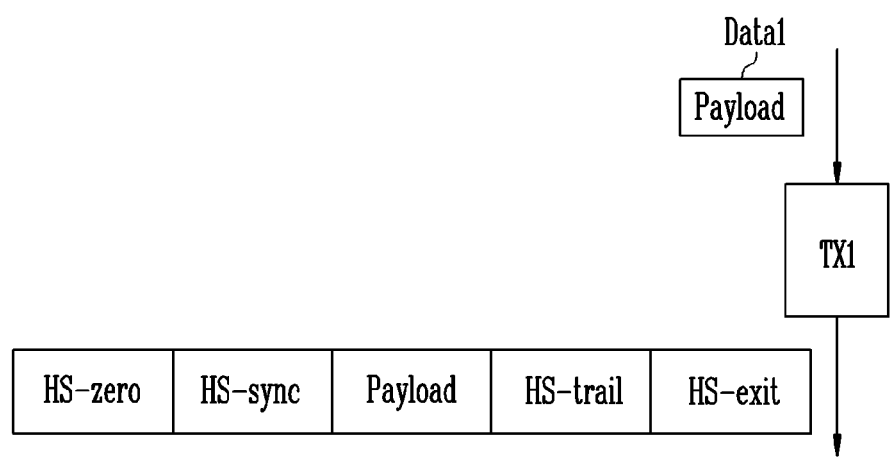
FIGS. 3 and 4 are diagrams for describing an embodiment of an operation of a transmitter in accordance with the disclosure.
Figure 4:
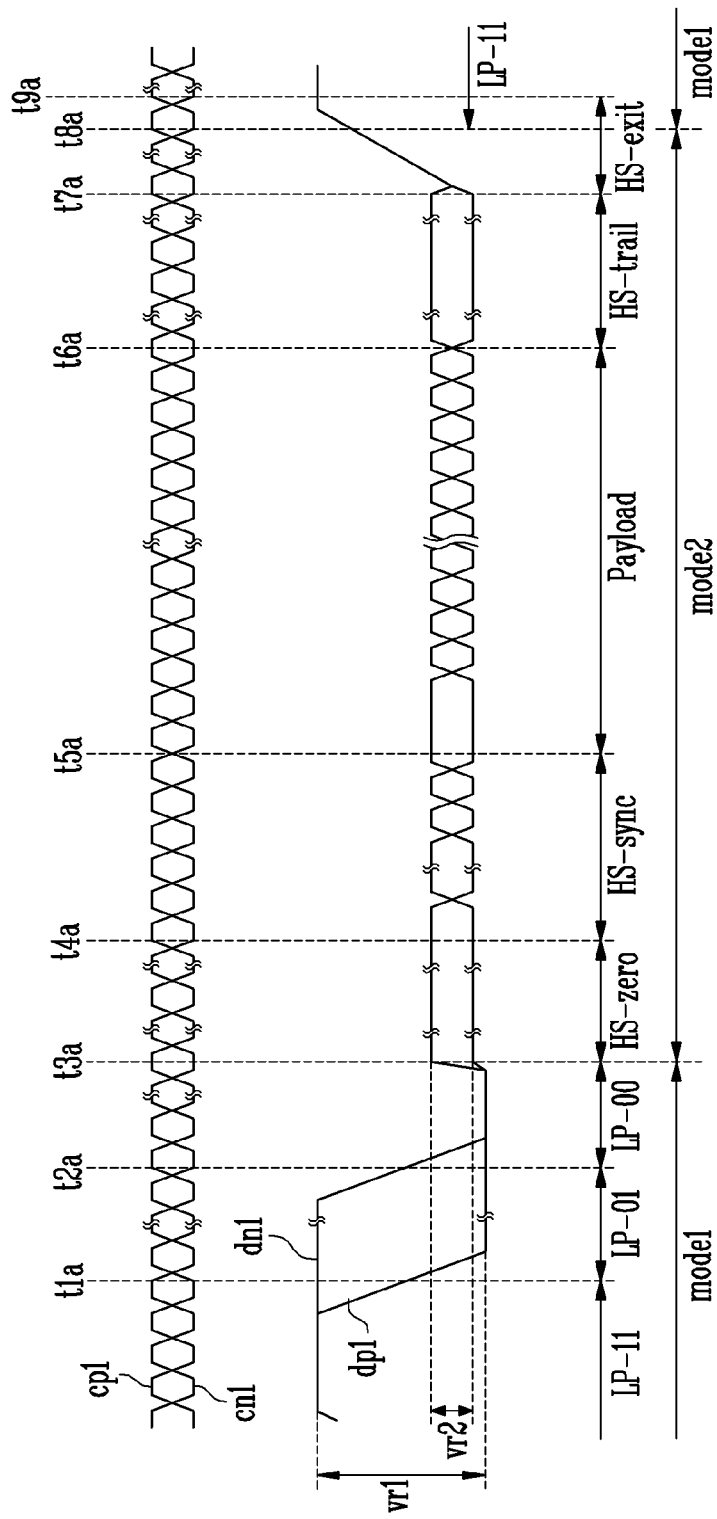

FIGS. 3 and 4 are diagrams for describing an embodiment of an operation of the transmitter TXD in accordance with the disclosure.

Referring to FIG. 3, the first data transmission unit TX1 may receive first data Data1 including a payload Payload. The first data transmission unit TX1 may transmit additional pieces of data before and/or after the payload Payload according to a preset protocol. In an embodiment, when the preset protocol is an MIPI protocol, the first data transmission unit TX1 may successively transmit pattern HS-zero, pattern HS-sync, the payload Payload, pattern HS-trail, and pattern HS-exit, for example.

Referring to FIG. 4, the transmitter TXD (particularly, the first data transmission unit TX1) may transmit signals having a first voltage range vr1 to the first line dp1 and the second line dn1 in a first mode mode1. The transmitter TXD may transmit signals having a second voltage range vr2 less than the first voltage range vr1 to the first line dp1 and the second line dn1 in a second mode mode2.

In an embodiment, an upper limit of the first voltage range vr1 may be higher than that of the second voltage range vr2, and a lower limit of the first voltage range vr1 may be lower than that of the second voltage range vr2, for example. In case that the MIPI protocol is applied to the transceiver TSCV, the first mode mode1 may be a low power ("LP") mode, and the second mode mode2 may be a high speed ("HS") mode.

The first line dp1 and the second line dn1 in the first mode mode1 may be used in a single-ended manner. In other words, in the first mode mode1, signals to be respectively transmitted to the first line dp1 and the second line dn1 may be identical with each other, or may be different from each other. The first line dp1 and the second line dn1 in the second mode mode2 may be used in a differential manner. In other words, in the second mode mode2, signals to be respectively transmitted to the first line dp1 and the second line dn1 may be different from each other. The first line dp1 may be a positive line, and the second line dn1 may be a negative line.

When transmitting the payload Payload to the receiver RXD, the transmitter TXD may be successively driven in the first mode mode1, the second mode mode2, and the first mode mode1.

To inform that the first mode mode1 is converted to the second mode mode2, the transmitter TXD may transmit preset patterns (e.g., pattern LP-11, pattern LP-01, and pattern LP-00) to the first line dp1 and the second line dn1.

In an embodiment, the transmitter TXD may maintain signals applied to the first line dp1 and the second line dn1 at a high level before a time point t1a (in pattern LP-11), for example. When a voltage level of a signal is greater than a preset first threshold voltage level, the voltage level may be determined to be the high level. When the voltage level of the signal is less than a preset second threshold voltage level, the voltage level may be determined to be a low level. Next, the transmitter TXD may change the signal of the first line dp1 to the low level at the time point t1a, and maintain the signal of the second line dn1 at the high level (i.e., in pattern LP-01). Next, the transmitter TXD may maintain the signal of the first line dp1 at the low level at a time point t2a, and change the signal of the second line dn1 to the low level (i.e., in pattern LP-00).

Next, the transmitter TXD may successively transmit, in the second mode mode2, pattern HS-zero, pattern HS-sync, the payload Payload, pattern HS-trail, and pattern HS-exit that have been described above. In an embodiment, the transmitter TXD may transmit pattern HS-zero during a period from a time point t3a to a time point t4a, transmit pattern HS-sync during a period from the time point t4a to a time point t5a, transmit the payload Payload during a period from the time point t5a to a time point t6a, pattern HS-trail during a period from t6a to t7a, and transmit pattern HS-exit after a time point t7a, for example.

Pattern HS-zero may be a pattern for informing of a waiting period after entering the second mode mode2 from the first mode mode1. In an embodiment, pattern HS-zero may be a pattern in which 0 is repeated, for example.

Pattern HS-sync may be a pattern for informing of a start of transmission of the payload Payload. For instance, pattern HS-sync may have a value of OxB8h or a value of 00011101.

The payload Payload may be valid data to be transmitted. Therefore, the payload Payload may include unspecific values rather than being a preset pattern.

Pattern HS-trail may be a pattern for informing of an end of the transmission of the payload Payload. Pattern HS-trail may be a pattern in which a value opposite to last data of the payload Payload is repeated. In an embodiment, in case that the last data (bit) of the payload Payload is 0, pattern HS-trail may be a pattern in which 1 is repeated, for example. In an embodiment, in case that the last data (bit) of the payload Payload is 1, pattern HS-trail may be a pattern in which 0 is repeated, for example.

Pattern HS-exit may be a pattern for informing that the second mode mode2 terminates and the first mode mode1 starts. Pattern HS-exit may not include a predetermined bit, and may be a transitional pattern in which the voltage increases to exceed the second voltage range vr2.

The transmitter TXD may change, from a time point t8a to a time point t9a, signals applied to the first line dp1 and the second line dn1 to the high level (i.e., in pattern LP-11). Therefore, the transmitter TXD may inform that the second mode mode2 terminates and the first mode mode1 starts. After the time point t9a, the high level of the signals may be maintained for a predetermined time period.

The transmitter TXD (particularly, the clock transmission unit TC) may transmit a transmission clock signal TxClk in a differential manner through the first clock line cp1 and the second clock line cn1 in the first mode mode1, the second mode mode2, and the first mode mode1 that are sequential. The first data reception unit RX1 may sample data received in the second mode mode2 based on the reception clock signal RxClk (refer to FIG. 2).

Figure 5:
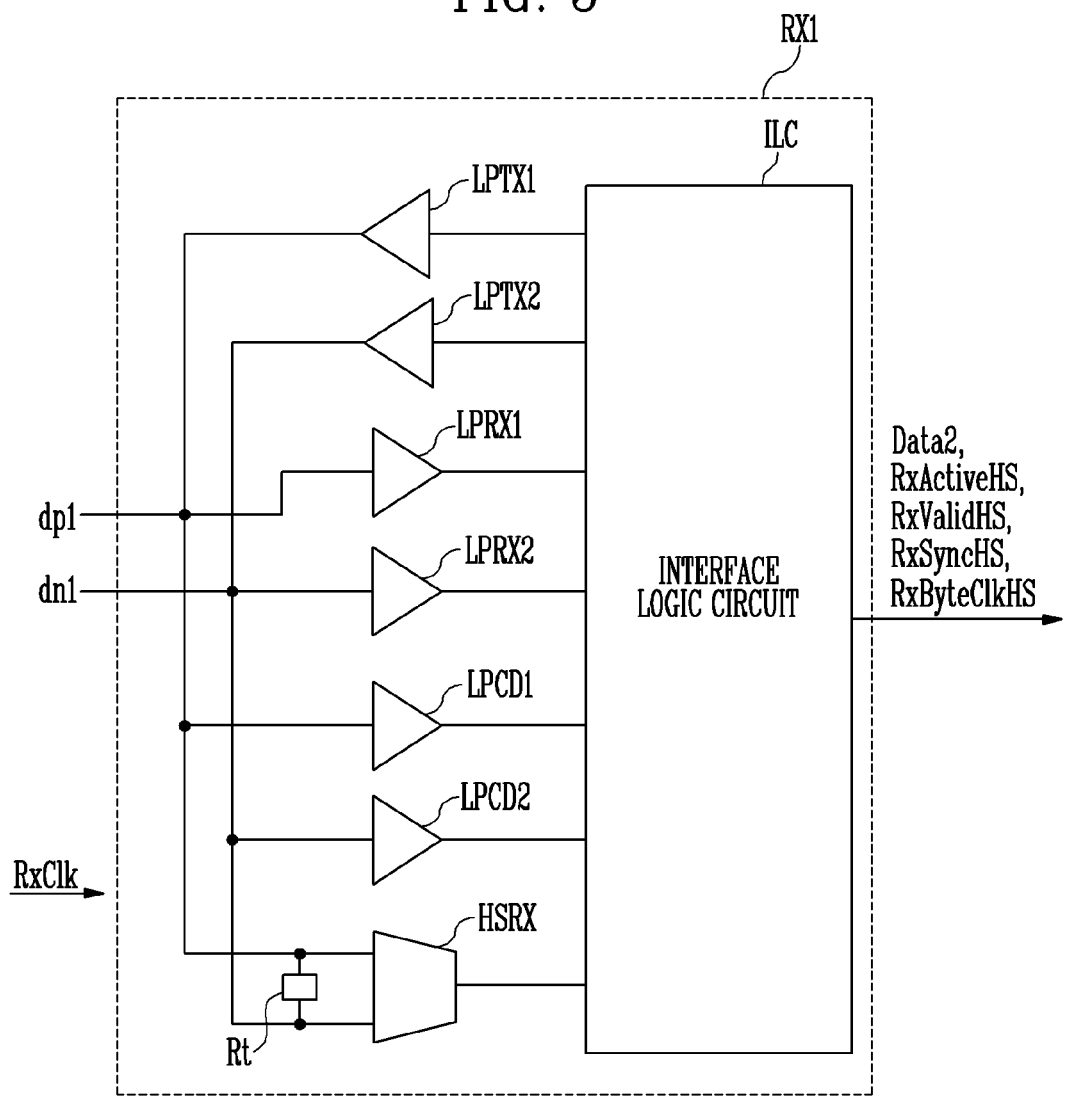
FIG. 5 is a diagram for describing an embodiment of a first data reception unit in accordance with the disclosure.

FIG. 5 is a diagram for describing an embodiment of a first data reception unit in accordance with the disclosure.

The first data reception unit RX1 in an embodiment of the disclosure may include a first low-power transmission amplifier LPTX1, a second low-power transmission amplifier LPTX2, a first low-power reception amplifier LPRX1, a second low-power reception amplifier LPRX2, a first low-power error amplifier LPCD1, a second low-power error amplifier LPCD2, a high-speed reception amplifier HSRX, a terminating resistor Rt, and an interface logic circuit ILC.

The first low-power transmission amplifier LPTX1 may include an input terminal connected to the interface logic circuit ILC, and an output terminal connected to the first line dp1. The second low-power transmission amplifier LPTX2 may include an input terminal connected to the interface logic circuit ILC, and an output terminal connected to the second line dn1. In case that there is a need to transmit data from the first data reception unit RX1 to the first data transmission unit TX1 in the first mode mode1, the first low-power transmission amplifier LPTX1 and the second low-power transmission amplifier LPTX2 may be operated.

The first low-power reception amplifier LPRX1 may include an input terminal connected to the first line dp1, and an output terminal connected to the interface logic circuit ILC. The second low-power reception amplifier LPRX2 may include an input terminal connected to the second line dn1, and an output terminal connected to the interface logic circuit ILC. In case that there is a need for the first data reception unit RX1 to receive data from the first data transmission unit TX1 in the first mode mode1, the first low-power reception amplifier LPRX1 and the second low-power reception amplifier LPRX2 may be operated.

The first low-power error amplifier LPCD1 may include an input terminal connected to the first line dp1, and an output terminal connected to the interface logic circuit ILC. The second low-power error amplifier LPCD2 may include an input terminal connected to the second line dn1, and an output terminal connected to the interface logic circuit ILC. In case that signals that do not correspond to the first voltage range vr1 are detected while the first low-power transmission amplifier LPTX1 and the second low-power transmission amplifier LPTX2 are operated, the first low-power error amplifier LPCD1 and the second low-power error amplifier LPCD2 may output error signals. In an embodiment, in case that respective signals of the first line dp1 and the second line dn1 do not correspond to the high level corresponding to the upper limit of the first voltage range vr1 or the low level corresponding to the lower limit of the first voltage range vr1, the first low-power error amplifier LPCD1 or the second low-power error amplifier LPCD2 may output an error signal, for example.

When in an eleventh state S111 (refer to FIG. 7) to be described below and the low-power transmission amplifiers LPTX1 and LPTX2 are operated, an error signal may be outputted in the following two cases. The first case corresponds to the case where the transmitter TXD transmits data in the second mode mode2 and, simultaneously, the receiver RXD transmits data in the first mode mode1. In this case, the level of the signal in the second mode mode2 becomes a ground level, so that the first low-power error amplifier LPCD1 or the second low-power error amplifier LPCD2 may output an error signal. The second case corresponds to the case where the transmitter TXD transmits data in the first mode mode1 and, simultaneously, the receiver RXD transmits data in the first mode mode1. In this case, since voltages outputted from the low-power transmission amplifiers LPTX1 and LPTX2 are different from voltages detected from the low-power error amplifiers LPCD1 and LPCD2, an error signal may be outputted.

The high-speed reception amplifier HSRX may include a first input terminal connected to the first line dp1, a second input terminal connected to the second line dn1, and an output terminal connected to the interface logic circuit ILC. In case that there is a need for the first data reception unit RX1 to receive data from the first data transmission unit TX1 in the second mode mode2, the high-speed reception amplifier HSRX may be operated. The high-speed reception amplifier HSRX may output, through the output terminal, a difference between the signals of the first line dp1 and the second line dn1 that are received in a differential scheme.

One electrode of the terminating resistor Rt may be connected to the first input terminal of the high-speed reception amplifier HSRX, and the other electrode of the terminating resistor Rt may be connected to the second input terminal of the high-speed reception amplifier HSRX. The terminating resistor Rt may be selectively provided for impedance matching.

Although, in the illustrated embodiment, the first data reception unit RX1 does not include a high-speed transmission amplifier, in another embodiment, the first data reception unit RX1 may include the high-speed transmission amplifier. In an embodiment, the high-speed transmission amplifier may be used in the case in which the first data reception unit RX1 transmits data to the first data transmission unit TX1 in the second mode mode2, for example. In this case, an input terminal of the high-speed transmission amplifier may be connected to the interface logic circuit ILC, and output terminals thereof may be connected to the first line dp1 and the second line dn1.

The interface logic circuit ILC may generate second data Data2 and data control signals RxActiveHS, RxValidHS, RxSyncHS, and RxByteClkHS, based on signals received from the first low-power transmission amplifier LPTX1, the second low-power transmission amplifier LPTX2, the first low-power reception amplifier LPRX1, the second low-power reception amplifier LPRX2, the first low-power error amplifier LPCD1, the second low-power error amplifier LPCD2, and the high-speed reception amplifier HSRX.

Figure 6:
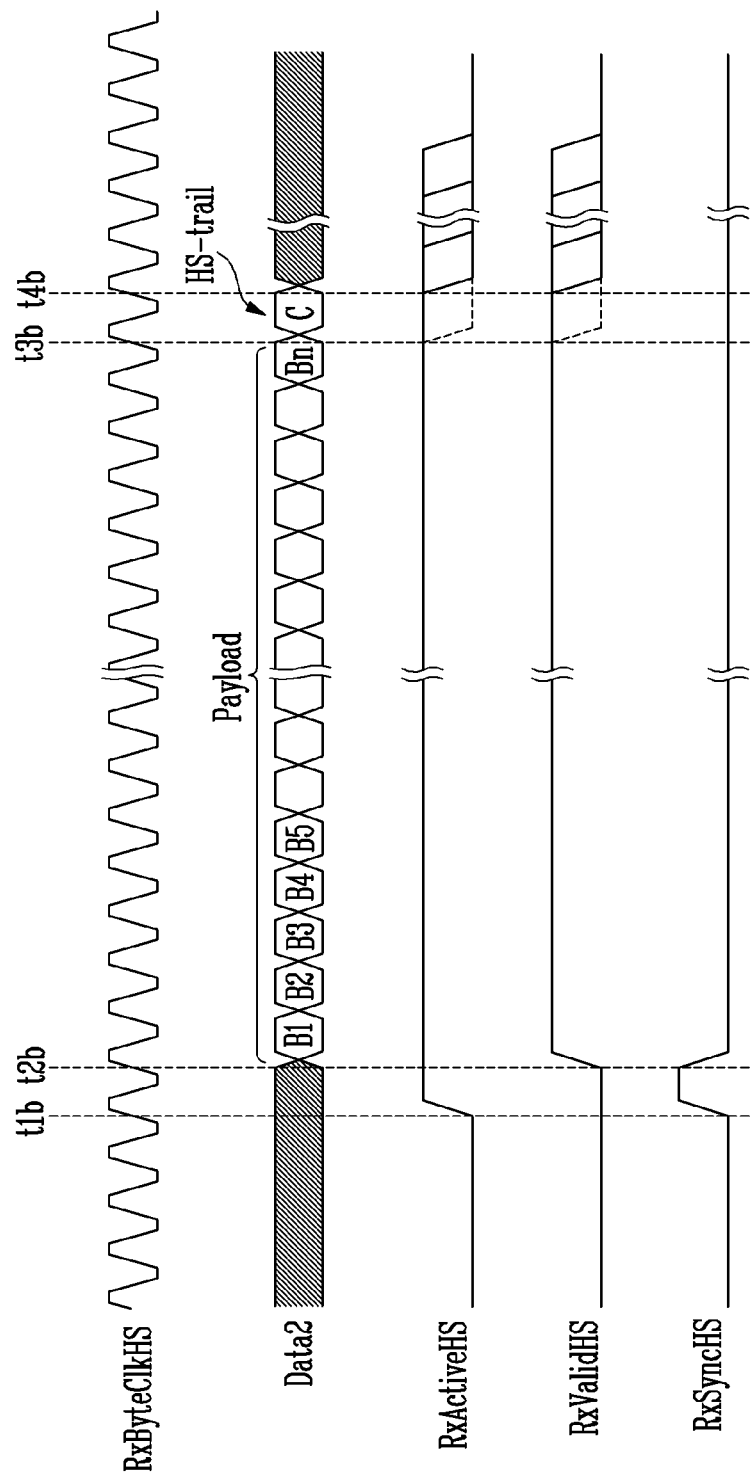
FIG. 6 is a diagram for describing an embodiment of an operation of the first data reception unit in accordance with the disclosure.

FIG. 6 is a diagram for describing an embodiment of an operation of the first data receiving unit in accordance with the disclosure.

Referring to FIG. 6, there is illustrated the second data Data2 and the data control signals RxActiveHS, RxValidHS, RxSyncHS, and RxByteClkHS that are generated from the receiver RXD (particularly, the interface logic circuit ILC).

The data control signal RxByteClkHS may be a clock signal for informing of the unit of data transmission on a byte basis. In an embodiment, it is indicated that one byte of the second data Data2 is transmitted in each cycle of the data control signal RxByteClkHS, for example. Furthermore, the data control signal RxByteClkHS may be a clock signal which is used to process data in the reception controller RXC. In an embodiment, the data control signal RxByteClkHS may be an overall system clock for processing data after passing through a deserializer, for example.

The second data Data2 may include a payload Payload formed on a byte basis (B1, B2, B3, B4, B5, . . . , Bn), and additional information C. In an embodiment, the additional information C may be information correspond to pattern HS-trail, for example. In an embodiment, the additional information C may be 8-bit information in which 0 is repeated or 1 is repeated, for example. In an embodiment, the interface logic circuit ILC may transmit, to the reception controller RXC, the second data Data2 obtained by parallelizing the sampled payload Payload and pattern HS-trail (e.g., in eighth lines) through the deserializer, for example.

The data control signal RxActiveHS may be changed in logic level from a first level (e.g., a low level) to a second level (e.g., a high level) at a time point t1b. The time point t1b may precede, by one cycle of the data control signal RxActiveHS, a time point t2b at which the transmission of the second data Data2 starts. The interface logic circuit ILC may determine the time point t1b based on a time point t5a at which pattern HS-sync terminates.

The data control signal RxValidHS may be changed in logic level from the first level to the second level at the time point t2b. The time point t2b may be a time point at which first data B1 of the payload Payload of the second data Data2 is outputted. The time point t2b may follow the time point t1b after one cycle of the control signal RxByteClkHS.

The data control signal RxSyncHS may be changed in logic level from the first level to the second level at the time point t1b, and may be changed in logic level from the second level to the first level at the time point t2b.

Figure 7:
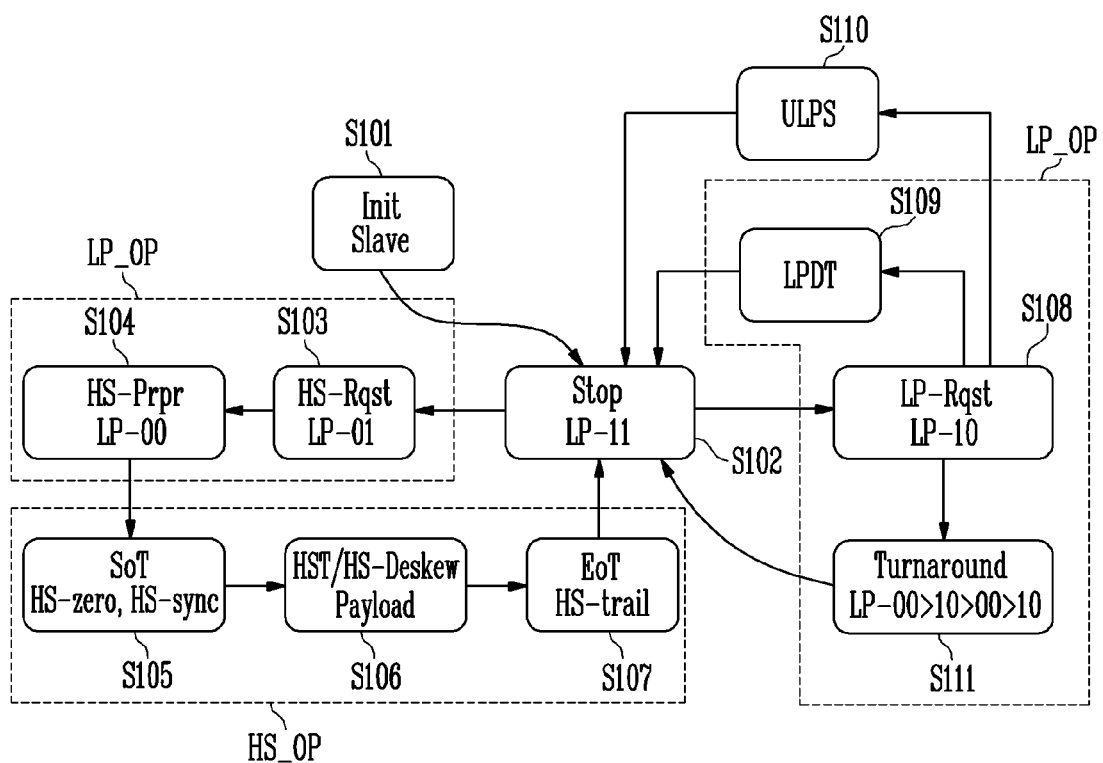
FIG. 7 is a diagram for describing a state machine of a mobile industry processor interface ("MIPI").

FIG. 7 is a diagram for describing a state machine of the MIPI.

In a first state S101, the receiver RXD is reset (initialized). The first state S101 may correspond to an initialization state Init Slave.

In the case in which the receiver RXD receives pattern LP-11 in the first state S101, the receiver RXD may enter a second state S102. The second state S102 may correspond to a stop state Stop in the first mode mode1. The stop state Stop may be a state in which high-level signals in the first voltage range vr1 are applied to the first line dp1 and the second line dn1 (i.e., a state in which pattern LP-II is applied thereto).

In the case in which the receiver RXD receives pattern LP-01 in the second state S102, the receiver RXD may enter a third state S103. The third state S103 may be a high-speed mode request state HS-Rqst (i.e., a communication request state of the second mode mode2). In the case in which the receiver RXD receives pattern LP-00 in the third state S103, the receiver RXD may enter a fourth state S104. The fourth state S104 may be a high-speed mode preparation state HS-Prpr. Referring to FIG. 4, the third state S103 and the fourth state S104 belong to the first mode mode1.

In the case in which the receiver RXD receives pattern HS-zero and pattern HS-sync in the fourth state S104, the receiver RXD may enter a fifth state S105. The fifth state S105 may correspond to a payload reception start state SoT. The receiver RXD may receive the payload Payload in the sixth state S106 after the fifth state S105. The sixth state S106 may correspond to a payload reception state HST/HS-Deskew. In the case where the receiver RXD receives pattern HS-trail, the receiver RXD may enter a seventh state S107. The seventh state S107 may correspond to a payload reception end state EoT. Referring to FIG. 4, the fifth, sixth, and seventh states S105, S106, and S107 belong to the second mode mode2. In the case in which the receiver RXD receives pattern LP-11 in the seventh state S107, the receiver RXD may enter the second state S102.

In the case in which the receiver RXD receives pattern LP-10 in the second state S102, the receiver RXD may enter an eighth state S108. Pattern LP-10 may be a state in which a high-level signal in the first voltage range vr1 is applied to the first line dp1 and a low-level signal in the first voltage range vr1 is applied to the second line dn1. The eighth state S108 may be a low-power-mode request state LP-Rqst (i.e., a communication request state of the first mode mode1).

The receiver RXD in the eighth state S108 may enter an escape mode. The escape mode may include a ninth state S109 and a tenth state S110. The ninth state S109 may be a state in which a host (the transmitter TXD or the receiver RXD) transmits data in the first mode mode1. The tenth state S110 may be an idle state ULPS of the receiver RXD. The idle state ULPS may be an ultra-low-power state ULPS of the MIPI. The ninth state S109 and the tenth state S110 may belong to the first mode mode1.

In the case in which the receiver RXD receives pattern LP-00>10>00>10 in the eighth state S108, the receiver RXD may enter an eleventh state S111. The eleventh state S111 may be a turnaround or bus-turn-around state Turnaround. In the case in which the receiver RXD enters the eleventh state S111, the host may be changed. In other words, when the current host is the transmitter TXD, the host may be changed to the receiver RXD after the receiver RXD enters the eleventh state S111. In other words, when the current host is the transmitter TXD, the host may be changed to the receiver RXD after the receiver RXD enters the eleventh state S111. The changed host may host data transmission in the above-mentioned ninth state S109.

In the following description with reference to FIGS. 11 and 12, the second state S102 may correspond to the stop state Stop in the first mode mode1. Furthermore, the states S103, S104, S108, S109, and S111 may correspond to an operating state LP_OP in the first mode mode1. Furthermore, the tenth state S110 may correspond to the idle state ULPS in the first mode mode1. The states S105, S106, and S107 may correspond to an operating state HS_OP in the second mode mode2.

Figure 8:
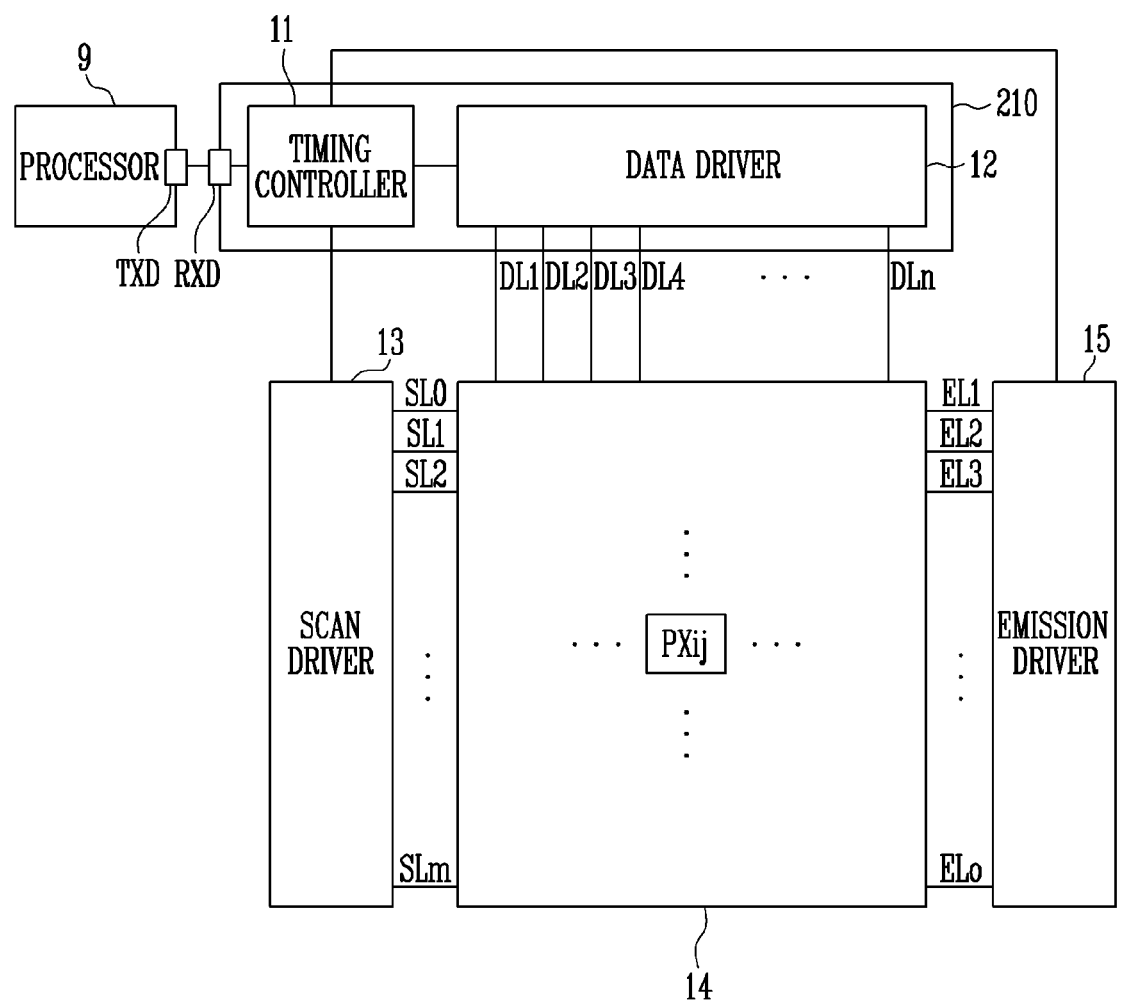
FIG. 8 is a diagram for describing an embodiment of a display device in accordance with the disclosure.

FIG. 8 is a diagram for describing an embodiment of a display device in accordance with the disclosure.

Referring to FIG. 8, the display device may include a TCON 11, a data driver 12, a scan driver 13, a pixel component 14, and an emission driver 15. The configuration of the foregoing functional components pertaining to whether to integrate the foregoing functional components on one IC or a plurality of ICs or whether to mount the functional components on a display substrate, for example, may be changed in various ways depending on the specifications of the display device. The TCON 11 and the data driver 12 may be integrated into one IC, and implemented as one display driver 210. Here, the display driver 210 may be also referred to as the above-stated TED IC. Depending on the type of display device, the display driver 210 may further include at least one of the scan driver 13 and the emission driver 15.

The processor 9 may correspond to at least one of a GPU, a CPU, an AP, or the like. The processor 9 may include the above-described transmitter TXD. The display driver 210 may include the above-described receiver RXD. The processor 9 and the display driver 210 may communicate with each other through the transmitter TXD and the receiver RXD.

The TCON 11 may receive grayscale signals and timing signals for each display frame period from the processor 9. The timing signals may include a vertical synchronization signal, a horizontal synchronization signal, a data enable signal, or the like.

Each cycle of the vertical synchronization signal may correspond to a corresponding display frame period. Each cycle of the horizontal synchronization signal may correspond to a corresponding horizontal period. The grayscale signals may be supplied on a horizontal-line basis in response to a pulse of a data enable signal during each horizontal period. The horizontal line may refer to pixels (e.g., a pixel line) connected to the same scan line and the same emission line.

The TCON 11 may render the grayscale signals in consideration of the specifications of the display device. In an embodiment, the processor 9 may provide a red grayscale signal, a green grayscale signal, and a blue grayscale signal for each unit dot, for example. In an embodiment, in the case in which the pixel component 14 has an RGB stripe structure, pixels may correspond one to one to respective grayscale signals, for example. In this case, rendering of the grayscale signals may not be desired. However, in the case where the pixel circuit 14 has a PENTILE™ structure, for example, since adjacent unit dots may share a pixel, the pixels may not correspond one to one to the respective grayscale signals. In this case, the rendering of the grayscale signals may be desired. Grayscale signals that have been rendered or have not been rendered may be provided to the data driver 12. Furthermore, the TCON 11 may provide a data control signal to the data driver 12. In addition, the TCON 11 may provide a scan control signal to the scan driver 13, and may provide an emission control signal to the emission driver 15.

The data driver 12 may generate, using the grayscale signals and the data control signal that are received from the TCON 11, data voltages (i.e., data signals) to be provided to data lines DL1, DL2, DL3, ..., DLn. Here, n is an integer greater than 0.

The scan driver 13 may generate, using scan control signals (e.g., a clock signal, a scan start signal, or the like) received from the TCON 11, scan signals to be provided to the scan lines SL0, SL1, SL2, ..., SLm. The scan driver 13 may sequentially supply scan signals each having a turn-on level pulse to the scan lines SL0 to SLm. Here, m is an integer greater than 0. The scan driver 13 may include scan stages including a shift register. The scan driver 13 may generate scan signals in such a way as to sequentially transmit a scan start signal having a turn-on level pulse to a subsequent scan stage under the control of a clock signal.

The emission driver 15 may generate, using emission control signals (e.g., a clock signal, an emission stop signal, or the like) received from the TCON 11, emission signals to be provided to the emission lines EL1, EL2, EL3, . . . , ELo. Here, o is an integer greater than 0. In an embodiment, o may be equal to m, but is not limited thereto. The emission driver 15 may sequentially supply emission signals each having a turn-on level pulse to the emission lines EL1 to ELo. The emission driver 15 may include emission stages, each of which includes a shift register. The emission driver 15 may generate emission signals in such a way as to sequentially transmit an emission stop signal having a turn-off level pulse to a subsequent emission stage under the control of a clock signal.

The pixel component 14 includes pixels. Each pixel PXij may be connected to a corresponding data line, a corresponding scan line, and an emission line. Here, i is an integer greater than 0 and equal to or less than m and j is an integer greater than 0 and equal to or less than n. The pixels may include pixels which emit a first color of light, pixels which emit a second color of light, and pixels which emit a third color of light. The first color, the second color, and the third color may be different colors. In an embodiment, the first color may be one of red, green, and blue, for example. The second color may be one of red, green, and blue, other than the first color. The third color may be the remaining color among the red, green, and blue, other than the first color and the second color. Furthermore, in lieu of red, green, and blue, magenta, cyan, and yellow may be used as the first to third colors.

Figure 9:
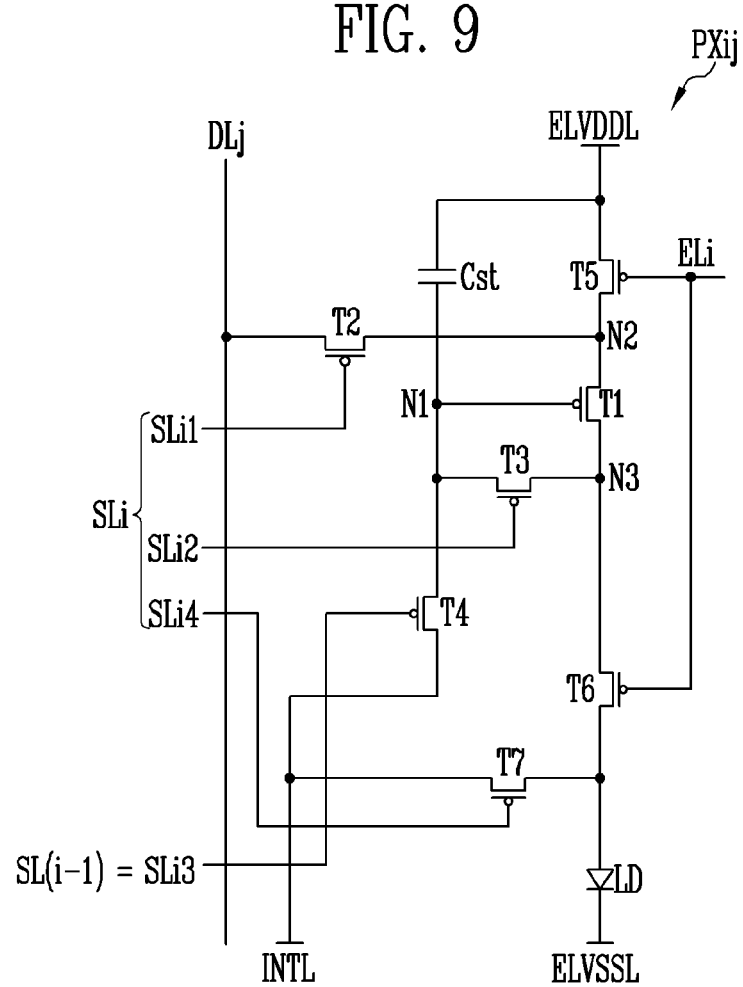
FIG. 9 is a diagram illustrating an embodiment of a pixel in accordance with the disclosure.

FIG. 9 is a diagram illustrating an embodiment of a pixel PXij in accordance with the disclosure.

Referring to FIG. 9, the pixel PXij includes transistors T1, T2, T3, T4, T5, T6, and T7, a storage capacitor Cst, and a light-emitting element LD.

Hereinafter, a circuit consisting of P-type transistors will be described by way of example. However, those skilled in the art may design a circuit consisting of N-type transistors by changing the polarity of the voltage to be applied to the gate terminal of each transistor. Likewise, those skilled in this art may design a circuit configured of a combination of a P-type transistor and an N-type transistor. The term "P-type transistor" is a general name for transistors in which the amount of current increases when a voltage difference between a gate electrode and a source electrode increases in a negative direction. The term "N-type transistor" is a general name for transistors in which the amount of current increases when a voltage difference between a gate electrode and a source electrode increases in a positive direction. Each transistor may be configured in various forms such as a thin film transistor ("TFT"), a field effect transistor ("FET"), and a bipolar junction transistor ("BJT").

The first transistor T1 may include a gate electrode connected to a first node N1, a first electrode
connected to a second node N2, and a second electrode connected to a third node N3. The first transistor T1 may be also referred to as a driving transistor.

The second transistor T2 may include a gate electrode connected to a scan line SLi1, a first electrode connected to a data line DLj, and a second electrode connected to the second node N2. The second transistor T2 may be also referred to as a scan transistor.

The third transistor T3 may include a gate electrode connected to a scan line SLi2, a first electrode connected to the first node N1, and a second electrode connected to the third node N3. The third transistor T3 may be also referred to as a diode connection transistor.

The fourth transistor T4 may include a gate electrode connected to a scan line SLi3, a first electrode connected to the first node N1, and a second electrode connected to an initialization line INTL. The fourth transistor T4 may be also referred to as a gate initialization transistor.

The fifth transistor T5 may include a gate electrode connected to an i-th emission line EL1, a first electrode connected to a first power line ELVDDL, and a second electrode connected to the node N2. The fifth transistor T5 may be also referred to as an emission transistor. In an embodiment, the gate electrode of the fifth transistor T5 may be connected to an emission line different from the emission line to which a gate electrode of the sixth transistor T6 is connected.

The sixth transistor T6 may include the gate electrode connected to the i-th emission line EL1, a first electrode connected to the third node N3, and a second electrode connected to an anode of the light-emitting element LD. The sixth transistor T6 may be also referred to as an emission transistor. In an embodiment, the gate electrode of the sixth transistor T6 may be connected to an emission line different from the emission line to which a gate electrode of the fifth transistor T5 is connected.

The seventh transistor T7 may include a gate electrode connected to a scan line SLi4, a first electrode connected to the initialization line INTL, and a second electrode connected to the anode of the light-emitting element LD. The seventh transistor T7 may be also referred to as a light-emitting-element initialization transistor.

The storage capacitor Cst may include a first electrode connected to the first power line ELVDDL, and a second electrode connected to the first node N1.

The light-emitting element LD may include the anode, which is connected to the second electrode of the sixth transistor T6, and a cathode, which is connected to a second power line ELVSSL. The light-emitting element LD may be a light-emitting diode. The light-emitting element LD may include an organic light-emitting diode, an inorganic light-emitting diode, a quantum dot/well light-emitting diode, or the like. The light-emitting element LD may emit light having any one of a first color, a second color, and a third color. Although, in the illustrated embodiment, only one light-emitting element LD is provided in each pixel, a plurality of light-emitting elements may be provided in each pixel in another embodiment. Here, the plurality of light-emitting elements may be connected in series, parallel, or series-parallel to each other.

A first power voltage may be applied to the first power line ELVDDL. A second power voltage may be applied to the second power line ELVSSL. An initialization voltage may be applied to the initialization line INTL. In an embodiment, the first power voltage may be greater than the second power voltage, for example. In an embodiment, the initialization voltage may be the same as or greater than the second power voltage, for example. In an embodiment, the initialization voltage may correspond to the lowest data voltage among data voltages that may be provided, for example. In an embodiment, the magnitude of the initialization voltage may be less than the magnitudes of the data voltages that may be provided.

Figure 10:
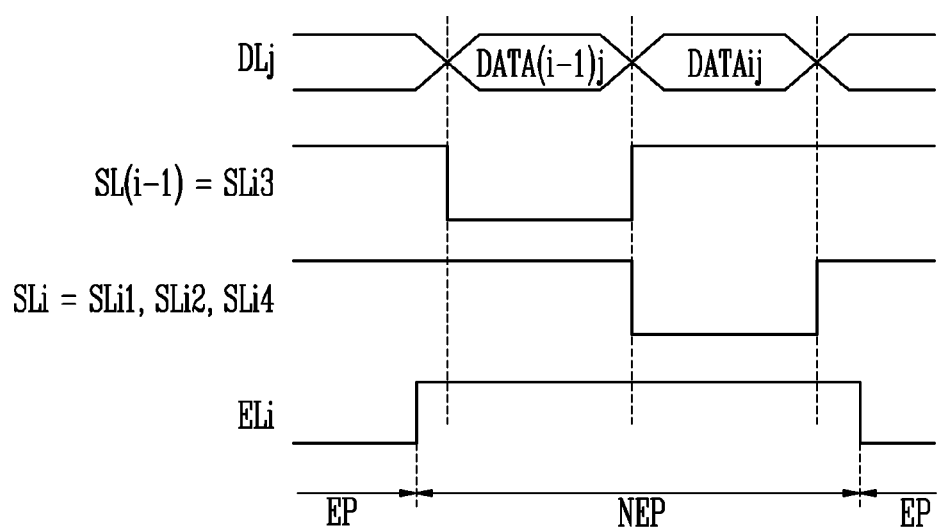
FIG. 10 is a diagram for describing a method of driving the pixel of FIG. 9.

FIG. 10 is a diagram for describing a method of driving the pixel of FIG. 9.

Hereinafter, for the convenience of explanation, it is assumed that each of the scan lines SLi1, SLi2, and SLi4 is an i-th scan line SLi, and that the scan line SLi3 is an i−1-th scan line SL(i−1). Here, connection relationships between the scan lines SLi1, SLi2, SLi3, and SLi4 may be changed in various ways depending on the embodiments. In an embodiment, the scan line SLi4 may be an i−1-th scan line or an i+1-th scan line, for example.

First, an emission signal having a turn-off level (a logic high level) may be applied to the i-th emission line EL1. A data voltage DATA(i−1)j for an i−1-th pixel may be applied to the data line DLj. A scan signal having a turn-on level (a logic low level) may be applied to the scan line SLi3. Whether the logic level is high or low may be changed depending on whether the transistor is a P-type or an N-type.

Here, since a scan signal having a turn-off level is applied to the scan lines SLi1 and SLi2, the second transistor T2 is turned off, so that the data voltage DATA(i−1)j for the i−1-th pixel may be prevented from being drawn into the pixel PXij.

Here, since the fourth transistor T4 is turned on, the first node N1 is connected to the initialization line INTL, and the voltage of the first node N1 is initialized. Since an emission signal having a turn-off level is applied to the emission line Eli, the transistors T5 and T6 are turned off, and the light-emitting element LD may be prevented from being unnecessarily operated during an initialization voltage application process.

Next, a data voltage DATAij for the i-th pixel PXij is applied to the data line DLj, and a scan signal having a turn-on level is applied to the scan lines SLi1 and SLi2. Hence, the transistors T2, T1, and T3 enter a state capable of conducting electricity, and the data line DLj and the first node N1 are electrically connected to each other. Therefore, a compensation voltage obtained by subtracting a threshold voltage of the first transistor T1 from the data voltage DATAij is applied to the second electrode (i.e., the first node N1) of the storage capacitor Cst. The storage capacitor Cst may maintain a voltage corresponding to a difference between the first power voltage and the compensation voltage. This period may be also referred to as a threshold voltage compensation period or a data write period.

Furthermore, in the case in which the scan line SLi4 is an i-th scan line, the seventh transistor T7 is turned on, so that the anode of the light-emitting element LD and the initialization line INTL may be connected and the light-emitting element LD may be initialized to the amount of charges corresponding to the difference between the initialization voltage and the second power voltage.

Thereafter, as an emission signal having a turn-on level is applied to the i-th emission line Eli, the transistors T5 and T6 may conduct electricity. Therefore, a driving current path that connects the first power line ELVDDL, the fifth transistor T5, the first transistor T1, the sixth transistor T6, the light-emitting element LD, and the second power line ELVSSL may be formed.

The amount of driving current that flows through the first electrode and the second electrode of the first transistor T1 may be adjusted in response to the voltage maintained in the storage capacitor Cst. The light-emitting element LD may emit light at a luminance corresponding to the amount of driving current. The light-emitting element LD may emit light until an emission signal having a turn-off level is applied to the emission line Eli.

When the emission signal is at a turn-on level, pixels that receive the corresponding emission signal may be in a display state. Therefore, a period during which the emission signal is at a turn-on level may be also referred to as an emission period EP (or an emission enable period). Furthermore, when the emission signal is at a turn-off level, pixels that receive the corresponding emission signal may be in a non-display state. Therefore, the period during which the emission signal is at a turn-off level may be also referred to as a non-emission period NEP (or an emission inhibit period).

The non-emission period NEP described with reference to FIG. 10 may be for preventing the pixel PXij from emitting light at an undesired luminance during the initialization period and the data write period.

While data written in the pixel PXij is maintained (e.g., during one frame period), one or more non-emission periods NEP may be added. The reason for this is because of the fact that, as the emission period EP is reduced, low gray scales may be effectively expressed, or motion in an image may be smoothly blur-processed.

The display device, the pixel, and the method of driving the display device and the pixel illustrated in FIGS. 8 to 10 are for describing one embodiment of application of the above-described transceiver TSCV, and the disclosure is not limited thereto. In an embodiment, the transceiver TSCV may be used for communication between the processor 9 included in the display device and a camera device, or may be used for communication between the processor 9 and a touch sensor (or other sensors), for example.

Figure 11:
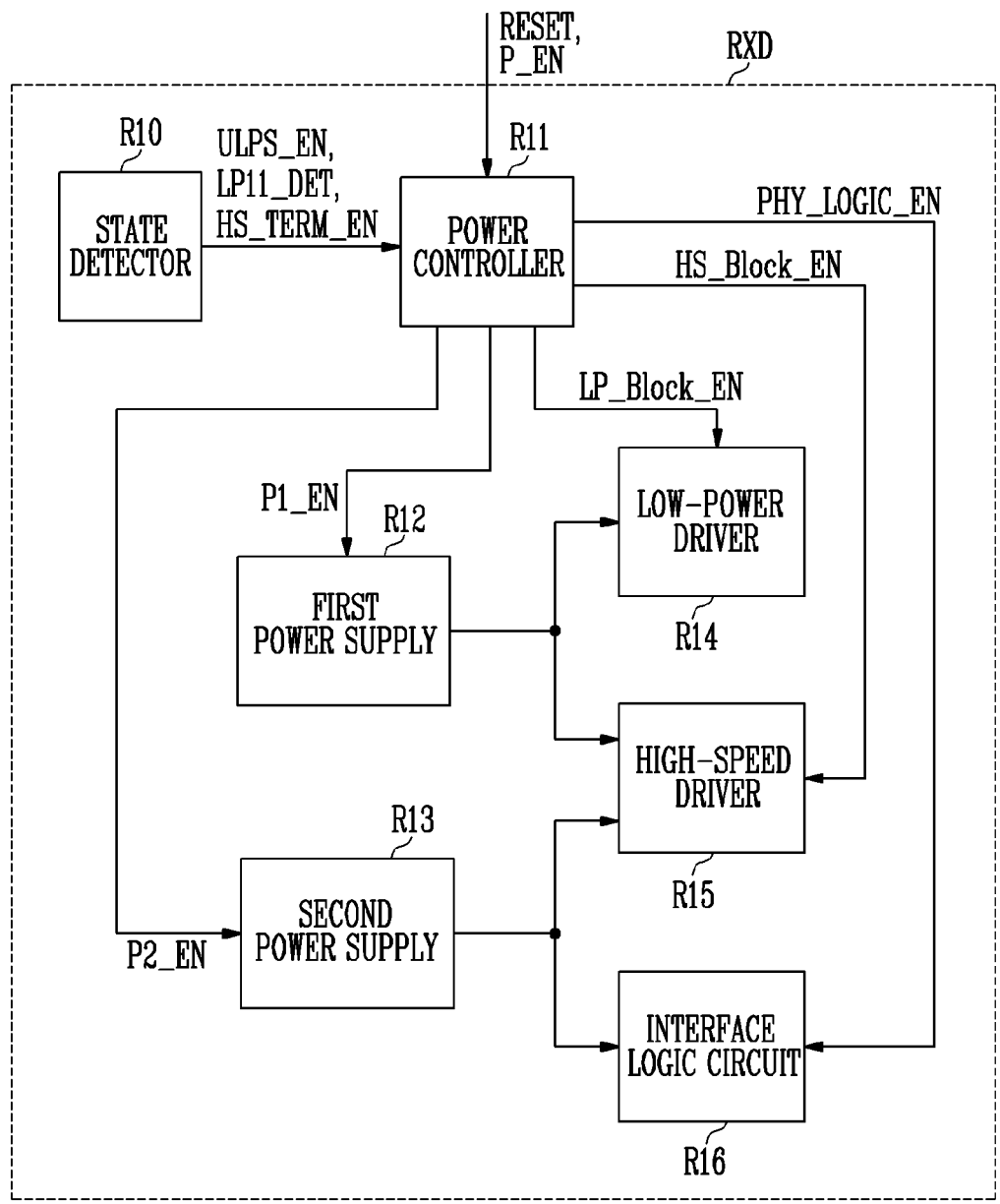
FIG. 11 is a diagram for describing an embodiment of a receiver in accordance with the disclosure.

FIG. 11 is a diagram for describing an embodiment of a receiver RXD in accordance with the disclosure. FIG. 12 is a diagram for describing an embodiment of a power control method of the receiver RXD in accordance with the disclosure.

Referring to FIG. 11, the receiver RXD in an embodiment of the disclosure may include a state detector R10, a power controller R11, a first power supply R12, a second power supply R13, a low-power driver R14, a high-speed driver R15, and an interface logic circuit R16.

The low-power driver R14 may include a first low-power transmission amplifier LPTX1, a second low-power transmission amplifier LPTX2, a first low-power reception amplifier LPRX1, a second low-power reception amplifier LPRX2, a first low-power error amplifier LPCD1, and a second low-power error amplifier LPCD2 (refer to FIG. 5). The high-speed driver R15 may include a high-speed reception amplifier HSRX and a terminating resistor Rt. The interface logic circuit R16 may include an interface logic circuit ILC (refer to FIG. 5).

The state detector R10 may generate a first input control signal ULPS_EN, a second input control signal LP11_DET, and a third input control signal HS_TERM_EN.

The level of the first input control signal ULPS_EN may be changed (or toggled) when an idle state starts or the idle state terminates. In an embodiment, the level of the first input control signal ULPS_EN may be changed from the low level to the high level when the idle state starts, for example. The level of the first input control signal ULPS_EN may be changed from the high level to the low level when the idle state terminates.

The level of the second input control signal LP11_DET may be changed when a stop state starts or the stop state terminates. In an embodiment, the level of the second input control signal LP11_DET may be changed from the low level to the high level when the stop state starts (or is detected), for example. The level of the second input control signal LP11_DET may be changed from the high level to the low level when the stop state terminates (i.e., when the pattern is converted to another pattern).

The level of the third input control signal HS_TERM_EN may be changed when the first mode mode1 is converted to the second mode mode2, or the second mode mode2 is converted to the first mode mode1. In an embodiment, the level of the third input control signal HS_TERM_EN may be changed from the low level to the high level when patterns LP-11, LP-01, and LP-00 are sequentially applied (refer to FIG. 7), for example. The level of the third input control signal HS_TERM_EN may be changed from the high level to the low level when the receiver RXD that is in the seventh state S107 enters the second state S102 (refer to FIG. 7).

The power controller R11 may control use of power in the first power supply R12, the second power supply R13, the low-power driver R14, the high-speed driver R15, and the interface logic circuit R16, based on the first input control signal ULPS_EN, the second input control signal LP11_DET, the third input control signal HS_TERM_EN, a fourth input control signal RESET, and a fifth input control signal P_EN.

The fourth input control signal RESET may be a signal, which is changed in level when the receiver RXD is reset (initialized) or when the receiver RXD is powered off. In an embodiment, the fourth input control signal RESET may be a control signal, which is received from the display driver 210 including the receiver RXD, for example. In an embodiment, the level of the fourth input control signal RESET may be changed from the low level to the high level when the receiver RXD receives a reset signal from the display driver 210 (i.e., enters the first state S101 of FIG. 7), for example. The level of the fourth input control signal RESET may be changed from the high level to the low level when the display driver 210 is powered off.

The fifth input control signal P_EN may be a signal, which is changed in level when the operation of the first power supply R12 and the second power supply R13 is enabled or the receiver RXD is powered off. In an embodiment, in the case in which the fifth input control signal P_EN receives a low dropout ("LDO") enable signal from the display driver 210, the level of the fifth input control signal P_EN may be changed from the low level to the high level, for example. The level of the fifth input control signal P_EN may be changed from the high level to the low level when the display driver 210 is powered off.

The power controller R11 may determine the logic levels of a first output control signal P1_EN, a second output control signal P2_EN, a third output control signal LP_Block_EN, a fourth output control signal HS_Block_EN, and a fifth output control signal PHY_LOGIC_EN, based on the logic levels of the first input control signal ULPS_EN, the second input control signal LP11_DET, the third input control signal HS_TERM_EN, the fourth input control signal RESET, and the fifth input control signal P_EN (refer to FIG. 12).

When the first output control signal P1_EN is at a low level, the first power supply R12 may stop the output of the first power voltage. When the first output control signal P1_EN is at a high level, the first power supply R12 may output the first power voltage.

When the second output control signal P2_EN is at a low level, the second power supply R13 may stop the output of the second power voltage. When the second output control signal P2_EN is at a high level, the second power supply R13 may output the second power voltage.

When the third output control signal LP_Block_EN is at a low level, the low-power driver R14 may stop receiving the first power voltage (e.g., as a power gating function). When the third output control signal LP_Block_EN is at a high level, the low-power driver R14 may receive the first power voltage and be operated using the first power voltage.

When the fourth output control signal HS_Block_EN is at a low level, the high-speed driver R15 may stop receiving the second power voltage (e.g., as a power gating function). When the fourth output control signal HS_Block_EN is at a high level, the high-speed driver R15 may receive the second power voltage and be operated using the second power voltage. When the fourth output control signal HS_Block_EN is at the low level, the high-speed driver R15 may stop receiving the first power voltage. When the fourth output control signal HS_Block_EN is at the high level, the high-speed driver R15 may receive the first power voltage and be operated using the first power voltage.

When the fifth output control signal PHY_LOGIC_EN is at a low level, the interface logic circuit R16 may stop receiving the second power voltage (e.g., as a power gating function). When the fifth output control signal PHY_LOGIC_EN is at a high level, the interface logic circuit R16 may receive the second power voltage and be operated using the second power voltage.

Referring to FIG. 12, in the case in which the display driver 210 is powered off, all of the first input control signal ULPS_EN, the second input control signal LP11_DET, the third input control signal HS_TERM_EN, the fourth input control signal RESET, and the fifth input control signal P_EN may be at the low levels. Here, the power controller R11 may set all of the logic levels of the first output control signal P1_EN, the second output control signal P2_EN, the third output control signal LP_Block_EN, the fourth output control signal HS_Block_EN, and the fifth output control signal PHY_LOGIC_EN to the low logic levels.

In the case in which the display driver 210 is powered on, the fourth input control signal RESET and the fifth input control signal P_EN may be at the high level, as described above. Regardless of whether the display driver 210 is in a sleep-in state or a sleep-out state (i.e., independently), the power controller R11 may be operated in a manner illustrated in the table of FIG. 12. Likewise, regardless of whether the receiver RXD enters the idle state ULPS or the idle state ULPS terminates (i.e., independently), the display driver 120 may be operated.

In the case where the first input control signal ULPS_EN has a low level, the second input control signal LP11_DET has a high level, the third input control signal HS_TERM_EN has a low level, the fourth input control signal RESET has a high level, and the fifth input control signal P_EN has a high level (in the case of the stop state Stop in the first mode mode1), the power controller R11 may output the first output control signal P1_EN having a high level, the second output control signal P2_EN having a high level, the third output control signal LP_Block_EN having a low level, the fourth output control signal HS_Block_EN having a low level, and the fifth output control signal PHY_LOGIC_EN having a low level.

In the case where the first input control signal ULPS_EN has a low level, the second input control signal LP11_DET has a low level, the third input control signal HS_TERM_EN has a low level, the fourth input control signal RESET has a high level, and the fifth input control signal P_EN has a high level (in the case of the operating state LP_OP in the first mode mode1), the power controller R11 may output the first output control signal P1_EN having a high level, the second output control signal P2_EN having a high level, the third output control signal LP_Block_EN having a high level, the fourth output control signal HS_Block_EN having a low level, and the fifth output control signal PHY_LOGIC_EN having a high level.

In the case where the first input control signal ULPS_EN has a low level, the second input control signal LP11_DET has a low level, the third input control signal HS_TERM_EN has a high level, the fourth input control signal RESET has a high level, and the fifth input control signal P_EN has a high level (in the case of the operating state HS_OP in the second mode mode2), the power controller R11 may output the first output control signal P1_EN having a high level, the second output control signal P2_EN having a high level, the third output control signal LP_Block_EN having a low level, the fourth output control signal HS_Block_EN having a high level, and the fifth output control signal PHY_LOGIC_EN having a high level.

In the case where the first input control signal ULPS_EN has a high level, the second input control signal LP11_DET has a low level, the third input control signal HS_TERM_EN has a low level, the fourth input control signal RESET has a high level, and the fifth input control signal P_EN has a high level (in the case of the idle state ULPS in the first mode mode1), the power controller R11 may output the first output control signal P1_EN having a high level, the second output control signal P2_EN having a low level, the third output control signal LP_Block_EN having a low level, the fourth output control signal HS_Block_EN having a low level, and the fifth output control signal PHY_LOGIC_EN having a low level.

In accordance with the embodiment of FIGS. 11 and 12, the low-power driver R14 may receive signals through the first line dp1 and the second line dn1 in the operating state LP_OP in the first mode mode1, and stop receiving the first power voltage in the second mode mode2. The low-power driver R14 may stop receiving the first power voltage in the stop state Stop in the first mode mode1. The low-power driver R14 may stop receiving the first power voltage in the idle state ULPS in the first mode mode1. The low-power driver R14 is not operated in the case where receiving the first power voltage is stopped, whereby the power consumption may be reduced.

The high-speed driver R15 may receive signals through the first line dp1 and the second line dn1 in the second mode mode2, and stop receiving the second power voltage in the first mode mode1. Furthermore, the high-speed driver R15 may stop receiving the second power voltage in the stop state Stop or the idle state ULPS. Here, the first power voltage may be greater than the second power voltage. The first power voltage may correspond to the upper limit (the high level) in the first voltage range vr1, which is relatively large, in the first mode mode1. In an embodiment, the first power voltage may be approximately 1.2 volts (V), for example. In an embodiment, the second power voltage may be set to approximately 1 V, for example. The high-speed driver R15 is not operated in the case where receiving the second power voltage is stopped, whereby the power consumption may be reduced.

The first power supply R12 may generate the first power voltage in the second mode mode2 and in the operating state LP_OP, the stop state Stop, and the idle state ULPS in the first mode mode1. In an embodiment, the first power supply R12 may include an existing linear regulator, e.g., a low-dropout ("LDO") regulator.

The second power supply R13 may generate the second power voltage in the second mode mode2 and in the operating state LP_OP and the stop state Stop in the first mode mode1. The second power supply R13 may not generate the second power voltage in the idle state ULPS in the first mode mode1.

The interface logic circuit R16 may receive the second power voltage in the mode mode2 and in the operating state LP_OP in the third mode mode1. The interface logic circuit R16 may stop receiving the second power voltage in the stop state Stop and the idle state ULPS in the first mode mode1. The interface logic circuit R16 is not operated in the case where receiving the second power voltage is stopped, whereby the power consumption may be reduced.

In a transceiver and a method of driving the transceiver in accordance with the disclosure, the use of power desired to drive the transceiver in each state of a state machine may be controlled such that the power consumption may be minimized.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims. Accordingly, the bounds and scope of the disclosure should be determined by the technical spirit of the following claims.

What is claimed is:

1. A transceiver comprising:
   a transmitter which is connected to a first line and a second line, transmits signals each having a first voltage range to the first line and the second line in a first mode, and transmits signals each having a second voltage range less than the first voltage range to the first line and the second line in a second mode; and
   a receiver which is connected to the first line and the second line and comprises:
   a low-power driver which receives signals through the first line and the second line in an operating state of the first mode, and stops an operation thereof in the second mode; and
   a high-speed driver which receives signals through the first line and the second line in the second mode, and stops an operation thereof in the first mode.

2. The transceiver according to claim 1, wherein the low-power driver stops the operation thereof in a stop state of the first mode.

3. The transceiver according to claim 2, wherein the stop state is a state in which high-level signals in the first voltage range are applied to the first line and the second line.

4. The transceiver according to claim 2, wherein the low-power driver stops the operation thereof in an idle state of the first mode.

5. The transceiver according to claim 4,
   wherein the further receiver comprises:
   a first power supply which generates a first power voltage in the second mode and in the operating state, the stop state, and the idle state of the first mode; and
   a second power supply which generates a second power voltage in the second mode and in the operating state and the stop state of the first mode, and
   wherein the second power supply does not generate the second power voltage in the idle state of the first mode.

6. The transceiver according to claim 5, wherein the receiver further comprises an interface logic circuit which generates data and data control signals based on signals received from the low-power driver and the high-speed driver.

7. The transceiver according to claim 6, wherein one of the data control signals is a clock signal indicating byte-unit transmission of the data.

8. The transceiver according to claim 6,
wherein the interface logic circuit is operated in the second mode and in the operating state of the first mode, and
wherein the interface logic circuit stops an operation thereof in the stop state and the idle state of the first mode.

9. The transceiver according to claim 4,
wherein the receiver further comprises a state detector which generates a first input control signal, a second input control signal, and a third input control signal,
wherein the first input control signal is changed in level when the idle state starts or the idle state terminates,
wherein the second input control signal is changed in level when the stop state starts or the stop state terminates, and
wherein the third input control signal is changed in level when the first mode is converted to the second mode or the second mode is converted to the first mode.

10. The transceiver according to claim 9,
wherein the receiver further comprises:
a first power supply which generates a first power voltage in the second mode and in the operating state, the stop state, and the idle state of the first mode;
a second power supply which generates a second power voltage in the second mode and in the operating state and the stop state of the first mode;
an interface logic circuit which generates data and data control signals based on signals received from the low-power driver and the high-speed driver; and
a power controller which controls operations of the first power supply, the second power supply, the low-power driver, the high-speed driver, and the interface logic circuit, based on the first input control signal, the second input control signal, the third input control signal, a fourth input control signal, and a fifth input control signal,
wherein the fourth input control signal is changed in level when the receiver is reset, or when the receiver is powered off, and
wherein the fifth input control signal is changed in level when the operations of the first power supply and the second power supply are enabled, or when the receiver is powered off.

11. A method of driving a transceiver comprising a transmitter and a receiver connected to each other by a first line and a second line, the method comprising:
transmitting, by the transmitter, signals each having a first voltage range to the first line and the second line in a first mode;
receiving, by a low-power driver of the receiver, signals through the first line and the second line in an operating state of the first mode, and stopping, by a high-speed driver of the receiver, an operation thereof in the first mode;
transmitting, by the transmitter, signals each having a second voltage range less than the first voltage range to the first line and the second line in a second mode; and
stopping, by the low-power driver of the receiver, an operation thereof in the second mode, and receiving, by the high-speed driver of the receiver, signals through the first line and the second line in the second mode.

12. The method according to claim 11, wherein the low-power driver stops the operation thereof in a stop state of the first mode.

13. The method according to claim 12, wherein the stop state comprises a state in which high-level signals in the first voltage range are applied to the first line and the second line.

14. The method according to claim 12, wherein the low-power driver stops the operation thereof in an idle state of the first mode.

15. The method according to claim 14,
wherein a first power supply of the receiver generates a first power voltage in the second mode and in the operating state, the stop state, and the idle state of the first mode,
wherein a second power supply of the receiver generates a second power voltage in the second mode and in the operating state and the stop state of the first mode, and
wherein the second power supply does not generate the second power voltage in the idle state of the first mode.

16. The method according to claim 15, wherein an interface logic circuit of the receiver generates data and data control signals based on signals received from the low-power driver and the high-speed driver.

17. The method according to claim 16, wherein one of the data control signals is a clock signal indicating byte-unit transmission of the data.

18. The method according to claim 16,
wherein the interface logic circuit is operated in the second mode and in the operating state of the first mode, and
wherein the interface logic circuit stops the operation in the stop state and the idle state of the first mode.

19. The method according to claim 14,
wherein a state detector of the receiver generates a first input control signal, a second input control signal, and a third input control signal,
wherein the first input control signal is changed in level when the idle state starts or the idle state terminates,
wherein the second input control signal is changed in level when the stop state starts or the stop state terminates, and
wherein the third input control signal is changed in level when the first mode is converted to the second mode, or the second mode is converted to the first mode.

20. The method according to claim 19,
wherein a first power supply of the receiver generates a first power voltage in the second mode and in the operating state, the stop state, and the idle state of the first mode,
wherein a second power supply of the receiver generates a second power voltage in the second mode and in the operating state and the stop state of the first mode,
wherein an interface logic circuit of the receiver generates data and data control signals based on signals received from the low-power driver and the high-speed driver,
wherein a power controller of the receiver controls operations of the first power supply, the second power supply, the low-power driver, the high-speed driver, and the interface logic circuit, based on the first input control signal, the second input control signal, the third input control signal, a fourth input control signal, and a fifth input control signal,
wherein the fourth input control signal is changed in level when the receiver is reset, or when the receiver is powered off, and wherein the fifth input control signal is changed in level when the operations of the first power supply and the second power supply are enabled, or when the receiver is powered off.

* * * * *